March 14, 1933. W. B. ROBE 1,901,000
HEAT TRANSFERRER FOR CONTROLLING SOLID $CO_2$ FOR REFRIGERATION PURPOSES
Filed April 8, 1930
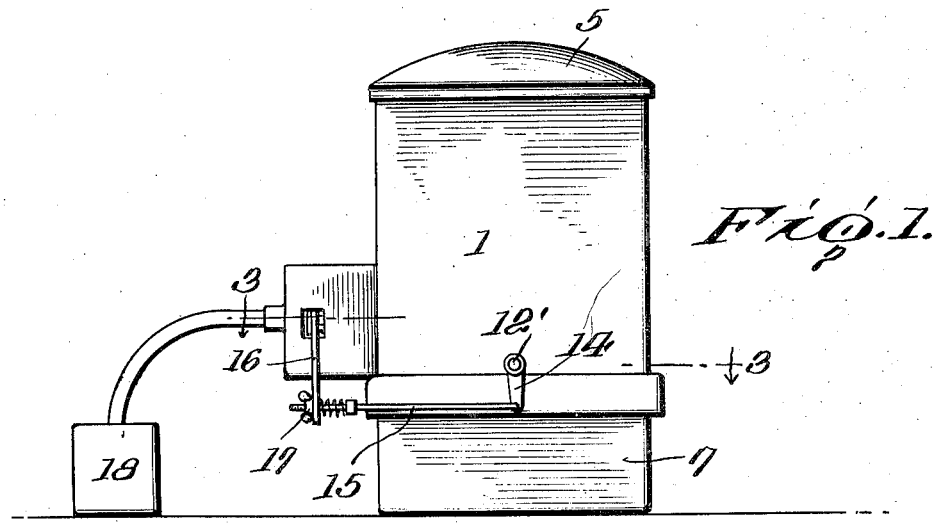
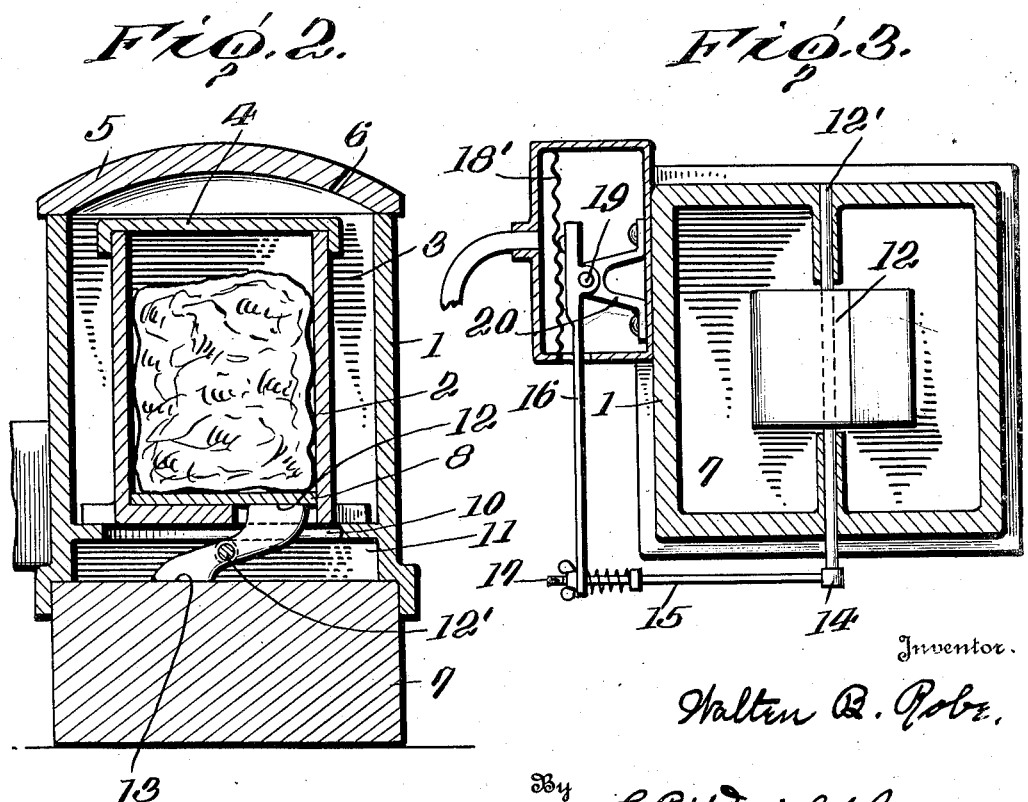

Patented Mar. 14, 1933

1,901,000

UNITED STATES PATENT OFFICE

WALTEN B. ROBE, OF TOWSON, MARYLAND, ASSIGNOR TO THERMAL CONTROL CORPORATION, A CORPORATION OF DELAWARE

HEAT TRANSFERRER FOR CONTROLLING SOLID $CO_2$ FOR REFRIGERATION PURPOSES

Application filed April 8, 1930. Serial No. 442,637.

My invention relates to improvements in a heat transferrer for controlling solid $CO_2$ for refrigeration purposes.

One object of the invention is to provide a cooling unit in which solid carbon dioxide (known in the trade as dry ice) may be used as a refrigerant, which cooling unit is provided with automatic means whereby the temperature of the chamber in which the cooling unit is placed can be controlled and maintained at any temperature from above freezing point to approximately seventy-five degrees below zero.

Another object of the invention is to provide an apparatus or a cooling unit of the above character wherein the carbon dioxide may be placed in a container partially surrounded by a region of relatively low heat conductivity and wherein means is provided in the region of heat transfer for varying the rapidity of heat transfer.

A further object of the invention is to provide a cooling unit or apparatus of the above character wherein the $CO_2$ gas or vapor passing off from the solid carbon dioxide is caused to fill the area of heat transfer for preventing the formation of frost or ice on the heat conducting surfaces.

A still further object of the invention is to provide a cooling unit or apparatus of the above character wherein the solid carbon dioxide may be placed in an inner container separated from the outer container by a space which is maintained filled with the carbon dioxide gas or vapor which is generated so as to aid in restricting heat transfer between the containers and in the preventing of frost or ice on the adjacent surfaces of either container.

In the accompanying drawings:—

Figure 1 is a side view of an apparatus adapted to carry out my invention.

Figure 2 is a vertical sectional view of Figure 1.

Figure 3 is a horizontal sectional view taken on the line 3—3 of Figure 1.

In the use of solid $CO_2$ (known in the trade as dry ice) for refrigerating purposes, great disadvantages have resulted in that solid $CO_2$ is so cold that a very low temperature was always maintained in the refrigerator or receptacle so that the articles to be kept therein were frozen too hard having an injurious effect thereon. It also prevented the use of the same for certain purposes as the articles would freeze and the freezing thereof ruin the same. There has never been any known way of accurately controlling the temperature of a receptacle using solid $CO_2$. If too small amount of solid $CO_2$ be placed in a receptacle of a given size it would at once absorb the heat therefrom and lower the temperature too low for certain refrigeration purposes and after all the $CO_2$ has been consumed, the receptacle would rapidly heat up, injuring the articles stored therein. If sufficient solid $CO_2$ was placed in the receptacle to last a predetermined length of time, the receptacle was kept too cold.

My improved apparatus is designed to keep a refrigerator or receptacle at any desired temperature for any reasonable length of time. This temperature not varying with the amount of solid $CO_2$ in the container.

Referring now to the drawing;

1 represents a receptacle made of any well known heat insulating material and in which is arranged a second receptacle 2 made of heat insulating material and spaced from the first receptacle having a space 3 entirely surrounding the inner receptacle, for holding the $CO_2$ vapor, for further insulating the $CO_2$ container as will be later more fully described. The inner receptacle is provided with a removable cover 4 so that a block of solid $CO_2$ may be placed in the inner receptacle. The cover 4 may either loosely fit upon the receptacle 2 or may be provided with an opening to allow the $CO_2$ vapor to pass from the container 2. The outer receptacle is provided with a removable cover 5 whereby access may be had to the inner receptacle and said cover is provided with a small vent 6 to allow the escape of air or excess $CO_2$ vapor, from the space surrounding the inner receptacle as will be later described.

The lower end of the outer receptacle 1 is closed by a block 7 of material of high specific heat or ability to absorb heat which is adapted to absorb the heat from the air surrounding the same for a purpose later to be described. The inner receptacle has in its lower end a plate 8 of high conductive material and upon which the block of solid $CO_2$ rests and whereby the heat from same is transmitted to the block of solid $CO_2$.

The bottom 9 of the inner receptacle below the plate 8 is cut away transversely of the receptacle as indicated at 10 and pivotally mounted in the space 11 below the inner receptacle 2 is a broad plate 12 of high conductive material having its pivots 12' mounted in the walls of the outer receptacle. The upper end of the plate 12 is shaped to have a broad flat surface 13 extending upwardly through cut away portion 10 of the bottom 9 of the inner receptacle and adapted to engage the bottom of the plate 8 upon which the solid $CO_2$ is supported. The lower end of the plate 12 is shaped to have a broad plate contacting surface adapted to engage the upper face of the block 7.

By the structure above described, the heat transfer will take place from the block 7 through the plate 12 and the plate 8 to the solid carbon dioxide within the inner container. When the plate 12 is in contact with the surface of the block 7 and the plate 8, the heat exchange will be very rapid. When, however, the plate 12 is moved out of contact with the block 7 and the plate 8, then the heat transfer will be greatly restricted and will depend upon the contact or the gap between the plate 12 and the surfaces with which it is adapted to contact.

It will be understood that the space entirely surrounding the inner receptacle is filled with $CO_2$ vapor passing from the solid $CO_2$ which forms an additional insulating means for preventing the heat from being transmitted to the block of $CO_2$. $CO_2$ vapor is heavier than air and therefore any air in the space is forced upward and out through the vent 6. $CO_2$ vapor also passes from this vent when considerable heat is transmitted to the solid $CO_2$. The $CO_2$ vapor fills the space between the inner and outer container and the space 11 and prevents the formation of any frost on the contact plate 12, plate 8 or block 7, or on any of the working parts, whereby contact plate 12 may be readily moved by the thermostat to allow a metallic contact with the plate 8 and the block 7. There must be an escape for the $CO_2$ vapor, and the escape of such vapor is in no way objectionable as this vapor is invisible, odorless and harmless.

Furthermore, this carbon dioxide gas or vapor filling the space between the chambers is very dry, and will prevent the formation of frost or ice on the outer face of the plate 8 and the inner face of the block 7 and also on the faces of the plate 12, thus maintaining the surfaces which are to make contact free from any insulating ice formation.

One pivot of the plate 12 on the outside of the receptacle 1 is provided with a laterally extending arm 14 to which is pivotally connected a rod 15 which extends outwardly along the side of the receptacle and is connected to the outer free end of the thermostatic bar 16. A connection 17 is adjustable so that the plate 12 will make contact between block 7 and plate 8 at different temperatures. The thermostatic bar may be operated by any desired thermostat and I have shown a conventional type. This thermostat is of the fluid type having a receptacle 18 holding a fluid operating diaphragm 18' which has the end of the thermostatic bar 16 engaged thereby. The bar 16 is pivotally mounted at 19 to the arm 20 and whereby the bar is moved under the influence of the fluid and the plate 12 is rocked upon its pivots.

From the foregoing description, my apparatus as shown is adapted to be placed in a refrigerator, a car, a room or any place used as a refrigerator or where it is desired to cool the air. The thermostat may be set for any desired temperature, as the solid $CO_2$ is so insulated within the inner chamber that very little heat is transferred thereto, except through the plate 12. This greatly restricts the area through which heat transfer takes place, and the amount of heat transferred through this restricted area may be regulated by the shifting of the plate 12, either into contact or by variably spacing the plate away from the surfaces with which it is adapted to contact. When the heat from the block 7 is absorbed by the solid $CO_2$ through the plate 8, the temperature of block 7 is reduced, which in turn absorbs heat from the surrounding medium. As soon as the medium surrounding the apparatus and the thermostat has reached a temperature set on the thermostat, the same rocks the plate 12 disengaging it from the block 7 and plate 8 and the medium around the apparatus will remain at this temperature and when slightly heated, the plate is again rocked and the temperature of the receptacle surrounding the same would again be cooled through absorbtion.

It has been found before contact is made or after contact is broken, between plate 8 and block 7 a radiation of heat takes place between surfaces until the gap is wide enough for $CO_2$ vapor to insulate the same. This greatly assists in the accuracy of heat control.

This apparatus can be adjusted to operate the plate 12 so that the temperature of the space or receptacle surrounding the apparatus will not vary more than a degree or two and thus providing absolute control for the use of solid $CO_2$ for cooling or refrigerating purposes.

While I have shown in the drawing, one form of apparatus embodying my invention, it will be understood that the same can be greatly varied without departing from my invention. The broad invention being in insulating solid $CO_2$ in a container and providing thermostatic or automatic means whereby heat can be conveyed from around the container directly to the solid $CO_2$ and thus lower the temperature around the apparatus.

While I have described my invention as applied to $CO_2$ it will be understood that the same could be used in connection with water, ice or any cooling medium.

Having thus fully described my invention, what I claim is:—

1. An apparatus of the character described comprising an outer casing, an inner casing within the outer casing and spaced from the walls thereof and adapted to hold solid $CO_2$, a heat absorbing member closing the lower end of the outer casing, a member within the space between the inner and outer container for forming a contact between the heat absorbing member and the solid $CO_2$ casing and automatic means on the outside of the casing for moving the member into or out of contact with the heat absorbing member and the solid $CO_2$ casing.

2. An apparatus of the character described comprising an outer receptacle, an inner receptacle within the outer receptacle and spaced from the walls thereof and adapted to hold solid $CO_2$ vapor, a heat absorbing member closing the lower end of the outer receptacle, a movable heat conducting member within the space between the inner and outer receptacles and adapted to be moved in and out of contact with the heat absorbing member and the solid $CO_2$ container for transmitting heat thereto, and thermostatic means for moving said member for breaking the contact between the heat absorbing member and the solid $CO_2$ container.

3. An apparatus of the character described comprising an outer container having its lower end closed by a heat absorbing member, an inner container therein and spaced from the walls thereof and adapted to hold solid $CO_2$ the lower end of said inner container having a cut away portion, a movable heat conducting member within the space between the inner and outer containers and adapted to be moved in and out of engagement with the heat absorbing member and with the solid $CO_2$ container through the opening in the bottom of the inner container and thermostatic means for controlling the movement of said movable heat conducting member.

4. An apparatus of the character described comprising an outer container having its lower end closed by a heat absorbing member, an inner container therein and spaced from the walls thereof and having its bottom provided with a cut away portion, a heat conducting member pivoted in the outer casing in the space below the inner container and the heat absorbing member and adapted to engage the heat absorbing member and extending into the opening in the lower end of the inner container for conducting heat from the heat absorbing member to the solid $CO_2$ and thermostatic means for moving said heat conducting member.

5. An apparatus of the character described comprising an outer container having a heat absorbing member in one wall, an inner container therein and spaced from the wall thereof and adapted to hold solid $CO_2$, said inner container having a cut away portion, a movable heat conducting member in the space between the inner and outer containers and adapted to be moved in and out of engagement with the heat absorbing member and with the solid $CO_2$ container through the opening in the inner container and thermostatic means for controlling the movement of said movable heat conducting member.

6. An apparatus of the character described comprising an outer casing, an inner casing within the outer casing and spaced from the walls thereof and adapted to hold solid $CO_2$, a heat absorbing member carried by the outer casing, means for forming a contact between the heat absorbing member and the solid $CO_2$ casing and automatic means on the outside of the casing for operating the means for forming a contact between the heat absorbing means and the solid $CO_2$ casing.

7. An apparatus of the character described comprising an outer casing, an inner casing within the outer casing and spaced from the walls thereof and adapted to hold solid $CO_2$, the space between the inner and outer casing adapted to hold $CO_2$ vapor, a heat absorbing member carried by the outer casing, means for forming a contact between the heat absorbing member and the solid $CO_2$ casing and automatic means on the outside of the casing for operating the means for forming a contact between the heat absorbing means and the solid $CO_2$ casing.

8. An apparatus of the character described comprising an outer receptacle, an inner receptacle within the outer receptacle and spaced from the walls thereof and adapted to hold solid $CO_2$, the space between the inner and outer receptacles adapted to hold $CO_2$ vapor, a heat absorbing member carried by the outer receptacle, means for forming a contact between the inner receptacle and the heat absorbing member carried by the outer receptacle and thermostatic means for controlling the means for forming the contact between the inner receptacle and the outer absorbing member carried by the outer receptacle.

9. An apparatus of the character described comprising an outer container, an inner container adapted to hold solid $CO_2$ and having a space between the containers, means for conveying the $CO_2$ vapor from the inner container to the space between the inner and outer containers and means for making a thermal connection between the inner container and outer container and thermostatic means for controlling the thermal connection between the inner and outer container.

10. An apparatus of the character described comprising an outer container, an inner container adapted to hold solid $CO_2$ and having a space between the containers, means for conveying the vapor of $CO_2$ from the inner container to the space between the inner and outer containers, means for transferring heat from the outer to the inner container through the said space and means for controlling the heat transferring means for varying the transfer of heat from the outer container to the inner container.

11. A cooling unit comprising an outer container, an inner container normally insulated from said outer container and adapted to receive solid carbon dioxide, means for establishing and varying a heat transfer from one container to the other, and means whereby the adjacent surfaces of the containers through which heat is transferred by said heat transfer means are subjected to carbon dioxide vapor thrown off by the solid carbon dioxide for preventing the accumulation of frost thereon.

12. A cooling unit comprising an outer container, an inner container normally insulated from said outer container and adapted to receive solid carbon dioxide, means for establishing and varying a heat transfer from one container to the other through a restricted area, and means whereby the adjacent surfaces of the container through which heat is transferred by said heat transfer means are subjected to carbon dioxide vapor thrown off by the solid carbon dioxide for preventing the accumulation of frost thereon.

In testimony whereof, I affix my signature.

WALTEN B. ROBE.